(12) United States Patent
Richardson (10) Patent No.: US 8,633,682 B2
(45) Date of Patent: Jan. 21, 2014

(54) SWITCHING POWER SUPPLY CONTROLLER WITH SELECTIVE FEEDBACK SAMPLING AND WAVEFORM APPROXIMATION

(75) Inventor: Kenneth G. Richardson, Erie, CO (US)

(73) Assignee: Analog Devices, Inc., Norwood, MA (US)

( * ) Notice: Subject to any disclaimer, the term of this patent is extended or adjusted under 35 U.S.C. 154(b) by 858 days.

(21) Appl. No.: 12/683,170

(22) Filed: Jan. 6, 2010

(65) Prior Publication Data

US 2010/0181980 A1 Jul. 22, 2010

Related U.S. Application Data

(60) Provisional application No. 61/205,446, filed on Jan. 21, 2009.

(51) Int. Cl.
*G05F 1/56* (2006.01)
*G05F 1/565* (2006.01)

(52) U.S. Cl.
USPC .......................................... 323/282; 323/285

(58) Field of Classification Search
USPC .......................................... 323/282, 283, 285
See application file for complete search history.

(56) References Cited

U.S. PATENT DOCUMENTS

| | | | | |
|---|---|---|---|---|
| 5,932,996 A * | 8/1999 | Liepe et al. | ................... | 323/284 |
| 7,545,129 B2 * | 6/2009 | Hane et al. | ................... | 323/282 |
| 7,545,132 B2 * | 6/2009 | Borowy et al. | ................ | 323/285 |
| 7,570,035 B2 * | 8/2009 | Kleveland | ..................... | 323/276 |
| 7,893,674 B2 * | 2/2011 | Mok et al. | ...................... | 323/283 |
| 2006/0239052 A1 * | 10/2006 | McGrath et al. | .............. | 363/147 |
| 2008/0007235 A1 * | 1/2008 | Hane et al. | .................... | 323/282 |
| 2008/0297128 A1 * | 12/2008 | Xu et al. | ........................ | 323/282 |
| 2009/0302815 A1 * | 12/2009 | Tanzawa | ........................ | 323/282 |

* cited by examiner

*Primary Examiner* — Adolf Berhane
*Assistant Examiner* — Nusrat Quddus
(74) *Attorney, Agent, or Firm* — Schwegman Lundberg & Woessner, P.A.

(57) ABSTRACT

A switching power supply controller which includes at least one switching element, and controls a switching cycle during which the switching elements are switched on and off to regulate the power supply's output voltage. The controller has a feedback signal which represents the output voltage, and a circuit node which conducts a current that is higher during a second portion of the switching cycle than it is during a first portion, such that the feedback signal varies with the current conducted by the node. To overcome feedback signal inaccuracies, a sampling circuit samples a signal which varies with the feedback signal only during the first portion of the switching cycle; the controller then regulates the output voltage in response to the sampled signal. The sampling circuit may be further arranged to produce an output which approximates the portion of the feedback signal waveform which is not sampled.

25 Claims, 6 Drawing Sheets

SWITCHING POWER SUPPLY CONTROLLER WITH SELECTIVE FEEDBACK SAMPLING AND WAVEFORM APPROXIMATION

RELATED APPLICATIONS

This application claims the benefit of provisional patent application No. 61/205,446 to Kenneth Richardson, filed Jan. 21, 2009.

BACKGROUND OF THE INVENTION

1. Field of the Invention

This invention relates to switching power supply controllers.

2. Description of the Related Art

Switching power supply controllers are typically fabricated as an integrated circuit (IC), which is connected to external components such as an output inductor and capacitor to form a complete switching power supply. A switching power supply requires one or more switching elements, which can be on- or off-chip.

Figure 1:
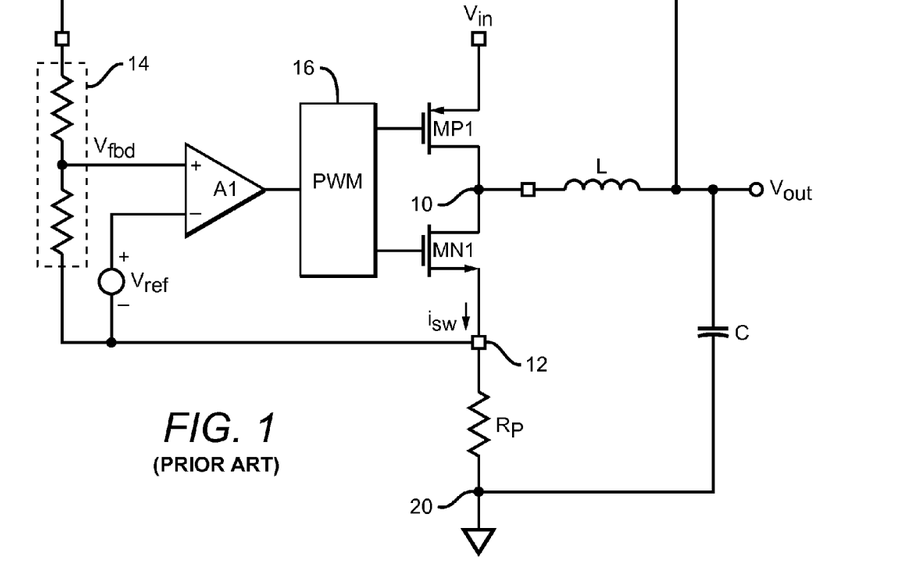
FIG. 1 is a block/schematic diagram illustrating a conventional switching power supply.

A typical switching power supply configuration is shown in FIG. 1. The on-chip components include a switching transistor MP1 connected between an input voltage $V_{in}$ and a switching node 10, and a switching transistor MN1 connected between switching node 10 and an internal chip ground node 12. An error amplifier A1 receives a feedback signal $V_{fbd}$ which varies with the power supply's output voltage $V_{out}$ (typically via a resistive divider 14) and a reference voltage $V_{ref}$ at respective inputs, and produces an output which drives the controller's switch driving circuitry 16, typically using pulse width modulation (PWM). When so arranged, both $V_{fbd}$ and $V_{ref}$ are referred to internal chip ground node 12. External components such as output inductor L and output capacitor C are connected to the controller IC to complete the switching power supply. The controller operates to regulate output voltage $V_{out}$ by controlling a 'switching cycle', which includes a first portion during which MP1 is closed and MN1 is open, and a second portion during which MP1 is open and MN1 is closed.

However, a problem can arise with a switching power supply controller IC having on-chip switches, such as that shown in FIG. 1. During the portion of the switching cycle when MN1 is turned on (and MP1 is off), all of the switch current $i_{sw}$ flows through chip ground node 12. However, chip ground node 12 must be connected an external ground node 20, to which the external components are referred. Ideally, there would be no resistance between chip ground node 12 and external ground node 20. However, in practice, a parasitic resistance $R_P$ is present between these nodes. When switch current $i_{sw}$ flows through $R_P$, a voltage drop is developed across $R_P$ which can reduce the accuracy of feedback signal $V_{fbd}$. This inaccuracy does not affect the feedback signal during the portion of the switching cycle when MP1 is turned on (and MN1 is off), because during this period, the switch current flows through switching node 10 and into inductor L, rather than through $R_P$. Thus, there is an error in the feedback signal only during certain portions of the switching cycle. Moreover, the parasitic resistance between the external ground node and the chip ground node is generally beyond the direct control of the controller designer, and so the magnitude of the resulting voltage drop is unknown.

One previous effort to address this problem involves the use of separate power and analog grounds to enable the controller to obtain an accurate measurement of the output voltage throughout the entire switching cycle. This approach, however, requires additional pins which are too costly for many applications. Another approach is to estimate the voltage drop caused by the switch current flowing through the parasitic resistance and to adjust the feedback accordingly. This approach, however, requires knowledge of the parasitic resistance value, which as mentioned above, is generally beyond the control of the designer.

SUMMARY OF THE INVENTION

A switching power supply controller is presented which employs selective feedback sampling and may also provide waveform approximation, enabling the controller to overcome the problems noted above.

The present switching power supply controller is adapted to be connected to external components to produce a regulated output voltage at an output node. The controller requires at least one switching element, and is arranged to control a switching cycle during which the switching elements are switched on and off to regulate the output voltage. The controller has a feedback signal which represents the output voltage produced at the output node, and a circuit node—such as a chip ground node—which conducts a current that is higher during a second portion of the switching cycle than it is during a first portion of the switching cycle, such that the feedback signal varies with the current conducted by the circuit node.

To overcome feedback signal inaccuracies, a sampling circuit is used to sample a signal which varies with the feedback signal only during the first portion of the switching cycle. The controller is then arranged to regulate the output voltage in response to the sampled signal.

The sampling circuit can be a sample and hold (S/H) circuit, a track and hold (T/H) circuit, or a combination of both, and may be differential or single-ended. The sampling circuit may be further arranged to produce an output which approximates the portion of the feedback signal waveform which is not sampled.

Further features and advantages of the invention will be apparent to those skilled in the art from the following detailed description, taken together with the accompanying drawings.

DETAILED DESCRIPTION OF THE INVENTION

Figure 2:
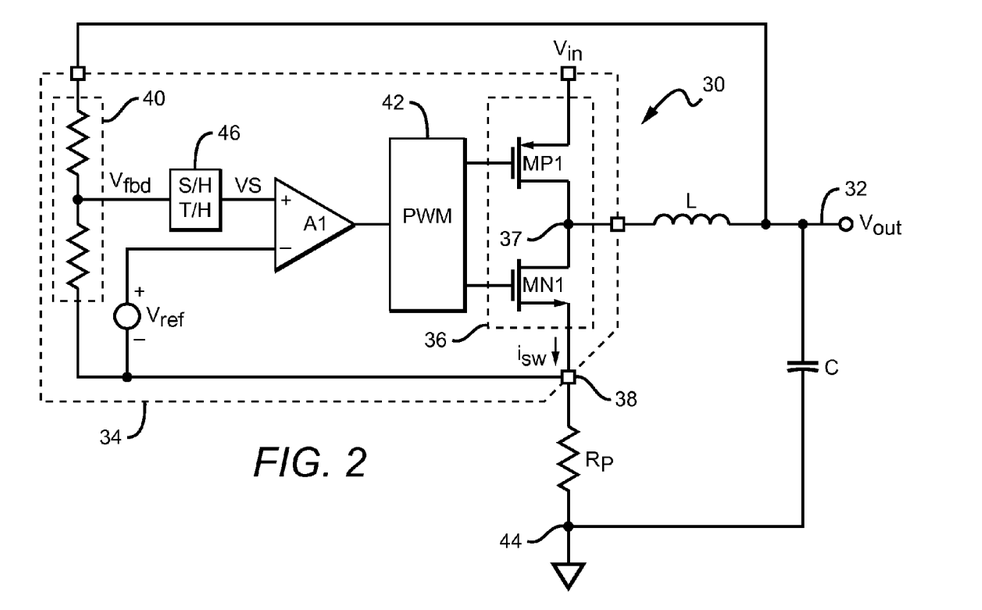
FIG. 2 is a block/schematic diagram illustrating one possible embodiment of a switching power supply controller per the present invention.

A switching power supply controller in accordance with the present invention is shown in FIG. 2. The controller 30 is adapted to be connected to external components to produce a regulated output voltage $V_{out}$ at an output node 32. In the exemplary embodiment shown in FIG. 2, the controller components are fabricated on a common IC die 34, which is connected to external components such as an output inductor L and output capacitor C. It should be understood that a practical switching power supply is likely to include additional components which, for clarity, have not been shown in FIG. 2.

The controller requires at least one switching element 36, and is arranged to control a switching cycle during which the switching elements are switched on and off to regulate output voltage $V_{out}$. In the embodiment shown, switching element 36 comprises a PMOS FET MP1 and an NMOS FET MN1 which are connected together at a switching node 37; however, other switching element types and configurations could also be used.

The controller has a feedback signal $V_{fbd}$, typically derived from $V_{out}$ with a resistive divider 40, which represents the output voltage produced at output node 32. An error amplifier A1 receives a signal which varies with feedback signal $V_{fbd}$ and a reference voltage $V_{ref}$ at respective inputs, and produces an output which drives the controller's switch driving circuitry 42, typically using pulse width modulation (PWM). When so arranged, both $V_{fbd}$ and $V_{ref}$ are referred to internal chip ground node 12.

In accordance with the present invention, the controller includes a circuit node 38—such as the internal chip ground node—which conducts a current that is higher during a second portion of the switching cycle than it is during a first portion of the switching cycle, such that feedback signal $V_{fbd}$ varies with the current conducted by the circuit node. For example, for the controller shown in FIG. 2, during the first portion of the switching cycle, MP1 is turned on (and MN1 is off), and the switch current ($i_{sw}$) flows through switching node 37 and into inductor L. However, during the second portion of the switching cycle, MN1 is turned on (and MP1 is off), and all of switch current $i_{sw}$ flows through chip ground node 38. However, chip ground node 38 is connected an external ground node 44, to which the external components are referred. As noted above, there would ideally be no resistance between chip ground node 38 and external ground node 44. However, in practice, a parasitic resistance $R_P$ is present between these nodes. As a result, when switch current $i_{sw}$ flows through $R_P$, a voltage drop is developed across $R_P$ which reduces the accuracy of feedback signal $V_{fbd}$. This inaccuracy does not affect the feedback signal during the first portion of the switching cycle.

To overcome this feedback signal inaccuracy, a sampling circuit is provided, which samples a signal which varies with the feedback signal only during the first portion of the switching cycle. The controller is then arranged to regulate the output voltage in response to the sampled signal. In the example shown in FIG. 2, a sampling circuit 46 is connected to receive and sample $V_{fbd}$, and to provide the sampled output (VS) to error amplifier A1. The sampling circuit can be, for example, a S/H circuit, a T/H circuit, or a combination of both, and may be differential or single-ended. By not sampling the feedback signal when low-side switch MN1 is on, the 'jumps' that would otherwise be seen in $V_{fbd}$ due to the change in voltage across $R_P$ will not be seen by the on-chip system.

Figure 3:
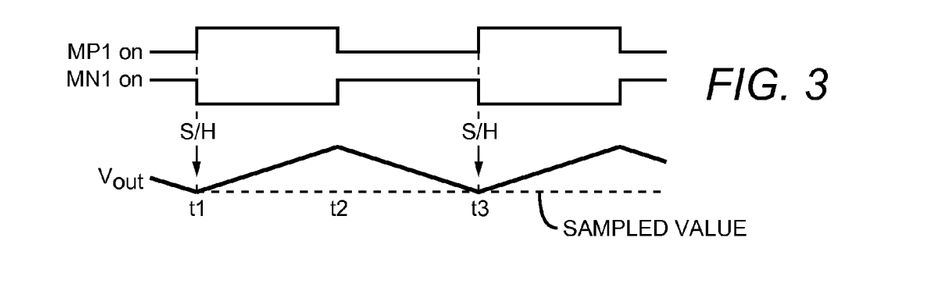
FIG. 3 is a timing diagram illustrating one possible sampling arrangement that might be used with a switching power supply controller per the present invention.

FIG. 3 illustrates the waveform of output voltage $V_{out}$ as switching transistors MP1 and MN1 are cycled on and off. A switching cycle consists of one period during which MP1 is on (during which the $V_{out}$ waveform is an upslope), followed by one period during which MN1 is on (during which $V_{out}$ is a downslope); thus, from t1 to t3 is one switching cycle. In accordance with the present controller, feedback voltage $V_{fbd}$, which tracks $V_{out}$, should be sampled by the sampling circuit during a $V_{out}$ upslope—i.e., at any time between t1 and t2. For example, a S/H circuit could be arranged to sample $V_{fbd}$ slightly after time t1, and to hold the signal at that level until the same point in the next switching cycle.

Figure 4:
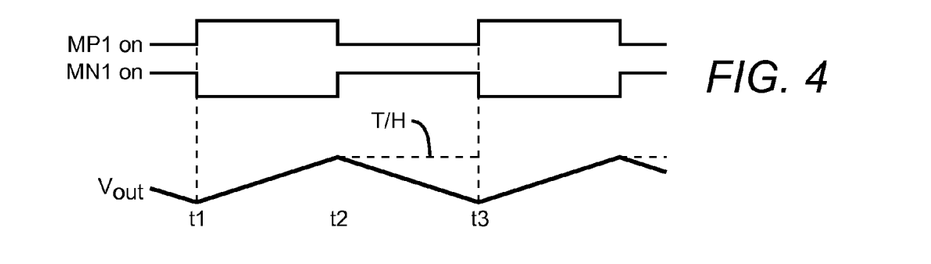
FIG. 4 is a timing diagram illustrating one possible tracking arrangement that might be used with a switching power supply controller per the present invention.

Another example is shown in FIG. 4. Here, a track and hold (T/H) circuit may track $V_{fbd}$ during the entire time between t1 and t2, then hold the peak value until time t3, at which point the T/H circuit is effectively reset to the value at t3, and then begins tracking $V_{fbd}$ again. Alternatively, at time t2, the T/H circuit may be reset to the value previously sampled by a S/H circuit at time t1. Countless variations and combinations are possible. For example, the outputs of several S/H and/or T/H circuits may be combined to obtain a composite or average value, and thereby obtain a more accurate average feedback value.

Referring again to FIG. 4, if a T/H circuit tracks $V_{fbd}$ between t1 and t2, then holds the peak value until time t3, the output of the T/H circuit will have a large step down as it begins tracking $V_{fbd}$ again at time t3. However, error amplifier A1 and other circuitry may have difficulty coping with a large step in the feedback signal. To overcome this potential problem, the present controller might be arranged to mimic or approximate the downslope of the feedback signal between time t2 and t3 to provide a smooth transition in the sampled feedback signal. Providing a synthesized portion of the feedback signal waveform in this manner may eliminate or reduce discontinuities in the feedback signal, which has implications for the controller's bandwidth requirements.

Figures 5, 6:
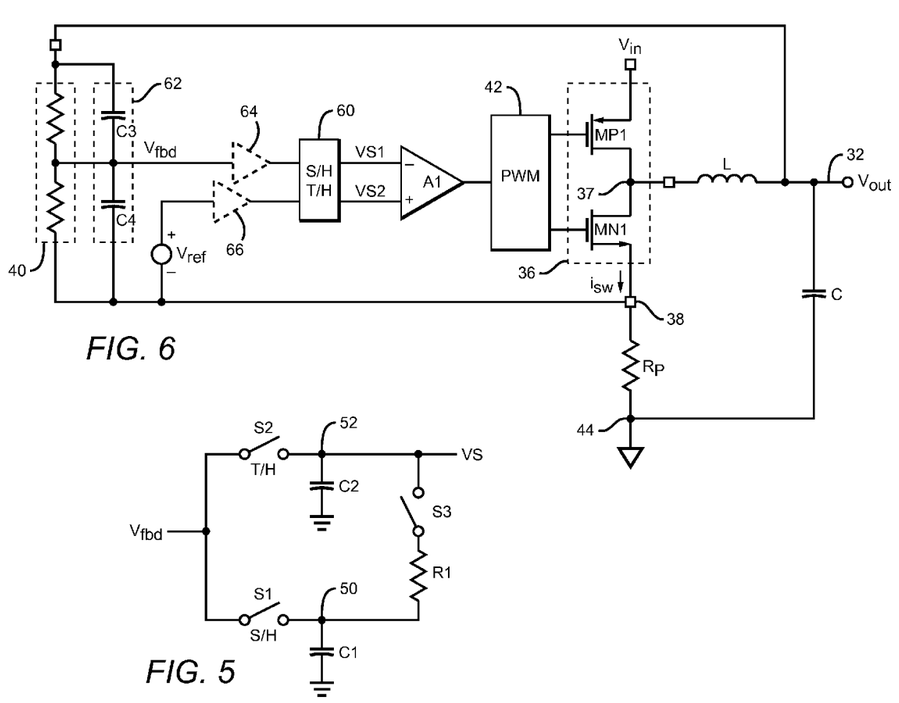
FIG. 5 is a block/schematic diagram illustrating one possible embodiment of a sampling and tracking circuit as might be used with a switching power supply controller per the present invention.
FIG. 6 is a block/schematic diagram illustrating one possible embodiment of a switching power supply controller per the present invention which employs differential S/H-T/H circuitry.

One circuit that might be used for approximating the downslope of the feedback signal is illustrated in FIG. 5. This circuit includes both S/H and T/H circuitry. The S/H circuit includes a sampling capacitor C1 connected between a first node 50 and a circuit common node, and a sampling switch S1 connected between feedback signal $V_{fbd}$ and node 50. The T/H circuit includes a tracking capacitor C2 connected between a second node 52 and the circuit common node, and a tracking switch S2 connected between feedback signal $V_{fbd}$ and node 52. The circuitry also includes a discharge switch S3 and a resistance R1 connected in series between nodes 50 and 52. The circuitry's output voltage VS is produced at node 52.

The controller is arranged such that, during the first portion (t1 to t2) of the switching cycle, sampling switch S1 is closed for a time sufficient to cause sampling capacitor C1 to be charged to a voltage approximately equal to the voltage of $V_{fbd}$ at the beginning of the upslope. Tracking switch S2 is closed from t1 to t2, causing the voltage on capacitor C2 to track $V_{fbd}$ until t2, such that C2 is charged to a voltage approximately equal to the voltage of $V_{fbd}$ at the peak of the upslope. Discharge switch S3 is open during this period.

Then, during the second portion of the switching cycle (t2 to t3), sampling and tracking switches S1 and S2 are open (and remain open until feedback signal $V_{fbd}$ is sampled and tracked again during the next upslope), and discharge switch S3 is closed. This results in the voltage stored on tracking capacitor C2 being gradually discharged through resistance R1 such that the circuit's output voltage VS decays towards the voltage stored on sampling capacitor C1 and thereby approximates the downslope of $V_{fbd}$. The values of C1, C2 and R1 may be adjusted as needed to provide any suitable approximation of the downslope. Sampled voltage VS is then delivered to error amplifier A1 as shown in FIG. 2.

Figure 7:
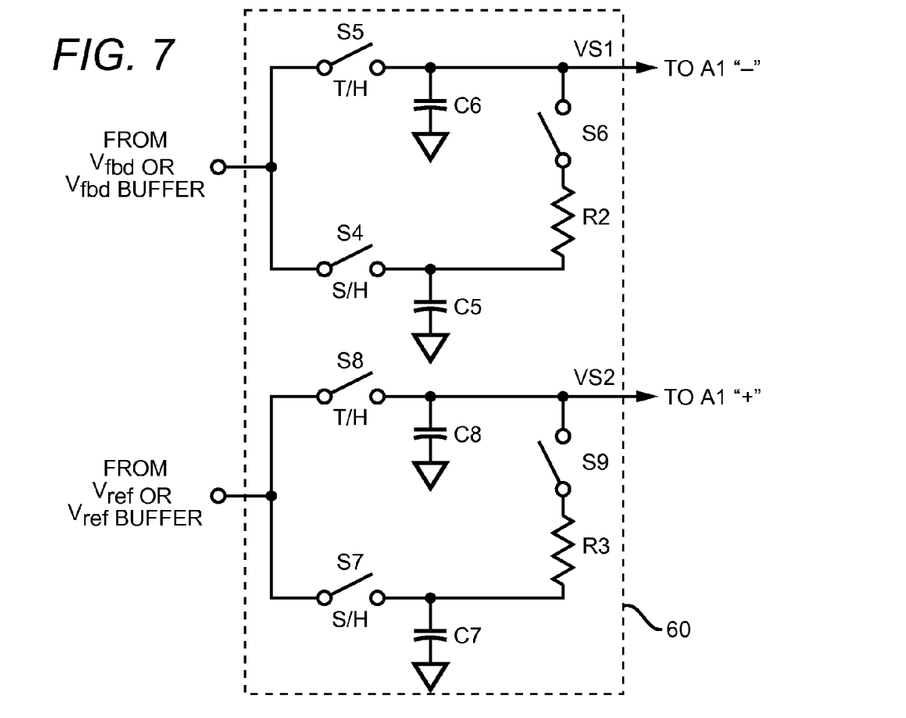
FIG. 7 is a block/schematic diagram illustrating one possible embodiment of differential sampling and tracking circuits as might be used with a switching power supply controller per the present invention.
Figures 8, 9B:
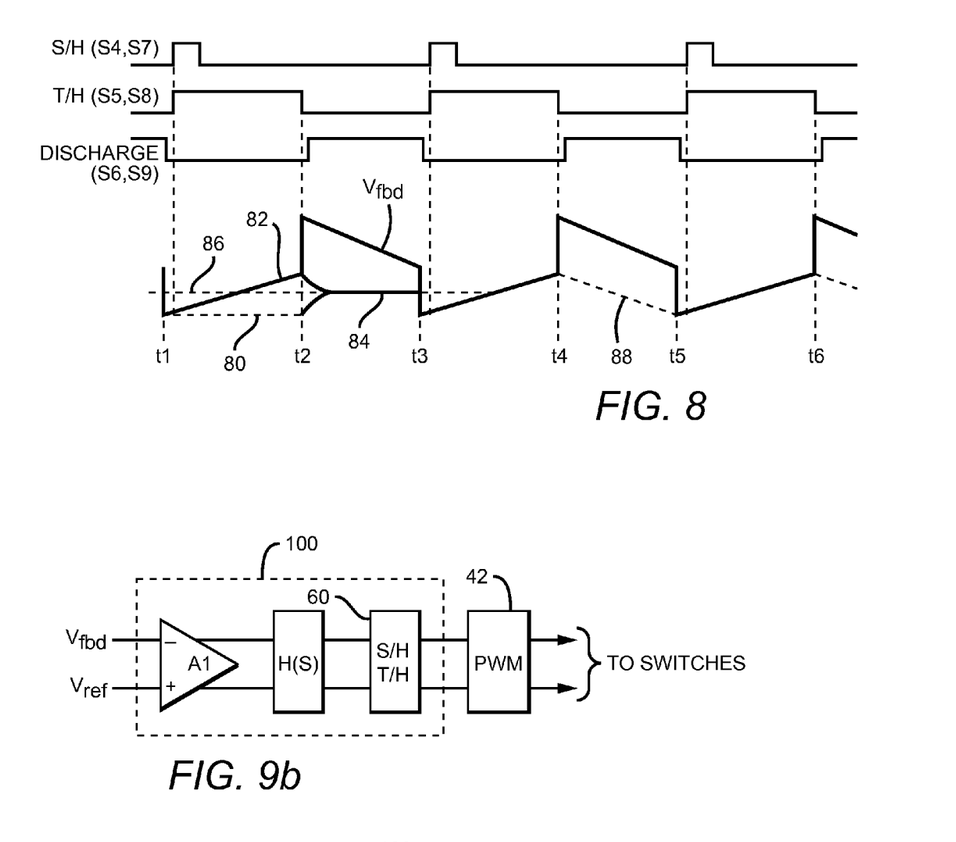
FIG. 8 is a timing diagram illustrating the overall operation of one possible embodiment of a switching power supply controller per the present invention.
FIG. 9b is a block/schematic diagram illustrating another possible order of circuit blocks for a switching power supply controller per the present invention.

In a preferred embodiment, a differential S/H-T/H system is employed; an overall schematic of a switching controller so arranged is shown in FIG. 6, exemplary differential S/H-T/H circuits 60 are shown in FIG. 7, and a corresponding timing diagram is shown in FIG. 8. The embodiment preferably includes a capacitor network 62, represented in FIG. 6 as capacitors C3 and C4, arranged to provide high frequency compensation for feedback divider 40. In the absence of such a network, extra parasitic poles may appear in the transfer function. The capacitance values are selected to correct for high frequency roll off; the lower capacitor is typically a gate capacitance on an input amplifier or comparator elsewhere in the design, and the upper capacitor is typically the one set to compensate for the lower (largely parasitic) one.

Though not essential, the preferred embodiment may also include a buffer amplifier 64 connected between $V_{fbd}$ and one input of error amplifier A1, and a buffer amplifier 66 connected between $V_{ref}$ and A1's other input. The two buffers are preferably identical, to provide both upper and lower S/H-T/H circuits the same source impedance. This generally improves common mode rejection for the system.

Exemplary differential S/H-T/H circuits 60 are shown in FIG. 7. The upper S/H-T/H circuit is used to sample and track $V_{fbd}$ or a signal which varies with $V_{fbd}$; it includes sampling switch S4, sampling capacitor C5, tracking switch S5, tracking capacitor C6, discharge switch S6 and a resistance R2, and produces an output VS1. The lower S/H-T/H circuit is used to sample and track $V_{ref}$ or a signal which varies with $V_{ref}$; it includes sampling switch S7, sampling capacitor C7, tracking switch S8, tracking capacitor C8, discharge switch S9 and a resistance R3, and produces an output VS2. It is preferred that $V_{fbd}$ and $V_{ref}$ be sampled with identical circuits as shown in FIG. 7, so as to preserve the differential accuracy of the error signal.

The operation of a system as shown in FIG. 6 is illustrated in the FIG. 8 timing diagram. For reference, a 'switching cycle' consists of one period during which switching transistor MP1 is on (and MN1 is off), followed by one period during which transistor MN1 is on (and MP1 is off). For example, in FIG. 8, MP1 is on between times t1 and t2, MN1 is on between t2 and t3, and then the cycle repeats. The diagram depicts the operation of the sampling, tracking and discharge switches over time, and how the switching affects voltage $V_{fbd}$.

The S/H switches S4 and S7 close briefly, shortly after time t1. Closing S4 charges C5 to the value of $V_{fbd}$ at the beginning of its upslope; the voltage stored on C5 is indicated in FIG. 8 as trace 80. During this same period, C7 is charged to the value of $V_{ref}$. S4 and S7 then remain open until the feedback and reference voltages are sampled again at the beginning of the next upslope, shortly after time t3 during the next cycle.

T/H switches S5 and S8 also close shortly after time t1. Closing S5 causes the voltage on capacitor C6 to track the feedback signal until t2, at which point S5 opens as the voltage on C6 reaches the peak value of the upslope; the voltage stored on C6 is indicated in FIG. 8 as trace 82. Similarly, closing S8 causes the voltage on capacitor C8 to track the reference voltage until t2. S5 and S8 are opened at t2 and remain open until shortly after time t3. The control signal sent to open the T/H switches is preferably derived early in the driver chain, so that the T/H switches are opened as soon as the control signal is sent to turn off MP1.

Discharge switches S6 and S9 open prior to or coincident with the closing of S4-S5 and S7-S8, and close after T/H switches S5 and S8 open. When S6 closes, the voltage (82) on C6 gradually discharges through S6 and resistor R2, and the voltage (80) on C5 gradually increases; the combined effect of these voltages is indicated with trace 84. If C5 and C6 are equal, the average value of trace 84 at time t3 will be approximately equal to the true average value of $V_{out}$, indicated in FIG. 8 as trace 86. The upper S/H-T/H circuit's output voltage VS1 decays from t2 to t3 toward the average value trace 86. This approximates the ideal downslope from t2 to t3; this approximation is reflected in FIG. 8 as trace 88. The lower S/H-T/H circuit behaves similarly during this period, with the average value of its output voltage VS2 being approximately equal to the reference voltage $V_{ref}$.

Between times t2 and t3 (and t4 and t5, etc.), the curvatures of the voltages stored on C5-C8—and thus the time constants for the mimicking circuitry—are controlled by the values of R2, C5 and C6 (for the upper circuit), and by R3, C7 and C8 (for the lower circuit).

Trace 88 represents the ideal downslope and it has an average value (when integrated from t4-t5) that largely matches trace 84 (integrated from t2-t3). Since there is no access to the actual waveform from t2-t3 or t4-t5, an internally generated average value can be used to mimic that waveform. A charge-sharing averaging input approach of this sort provides good results: having the error amplifier presented with the average value of the downslope ripple at the next switching time—i.e., at t1, t3, t5 etc.—gives a good result for both positive and negative output currents. Note that during a transient, the power supply needs to sink some output current during an overshoot.

The T/H path preserves the "upper" peak of a waveform that generally has a somewhat triangular ripple around an average value (for ideal components, the shape is more correctly parabolic for a 2 pole filter), and the S/H path preserves the "lower" peak. By using the upper peak from the T/H directly, the PWM circuitry shuts off at the same point that it would in a circuit without the T/H, largely preserving the phase characteristics of an unsampled trailing edge modulator. This is desirable, but the value "held" by the T/H after the switching occurs presents the amplifier chain with a voltage that is not an accurate reflection of the average value of the error signal. Similarly, the S/H holds the "lower" peak. By closing the switch that shorts the paths together, a good estimate of the average value of the error signal is computed by charge sharing. The "averaged" signal continues through the error amplifier chain with less error. Then, when the T/H path becomes active again, the new error signal has a smaller jump associated with the T/H tracking the output ripple, which typically has a different value from the average.

Note that the invention is not limited to the implementations of the S/H-T/H circuitry shown in FIGS. 5 and 7; many other T/H and S/H circuits are known that would be suitable for use with the present invention.

In general, a preferred embodiment of the present system samples feedback signal $V_{fbd}$ during specific periods (e.g., from t1 to t2), and then provides an estimate of what the 'correct' voltage would during periods which are unsampled (e.g., from t2 to t3). The system does not correct the error in $V_{fbd}$, but rather provides a signal that preserves the important features of the $V_{fbd}$ signal and thus eliminates the 'jumps' that would otherwise be seen by the on-chip system. The corrected (estimated) signal is used by the downstream error amplifier as if it were the "correct" signal, as might be present in a package with very small parasitic impedances.

The present system encompasses many possible embodiments and implementations; it is only necessary that the output voltage feedback signal be measured at selective times in order to avoid an undesirable voltage drop due to the current at a particular circuit node varying during the switching cycle. For example, there are applications in which the supply pin ($V_{in}$) of a switching power supply with on-chip switches is part of a measurement loop, rather than the common chip return (gnd); in these cases, the S/H or T/H function would be applied during the time when the current in the $V_{in}$ pin is low. In general, for a switching power supply controller having a node which can impact the value of $V_{fbd}$ depending on whether current through the node is high or low, the system is designed such that $V_{fbd}$ is only measured when the current flow through the node is low. The present system also encompasses any approximating or mimicking means for providing a relatively smooth transition between sampling times.

Figure 9A:
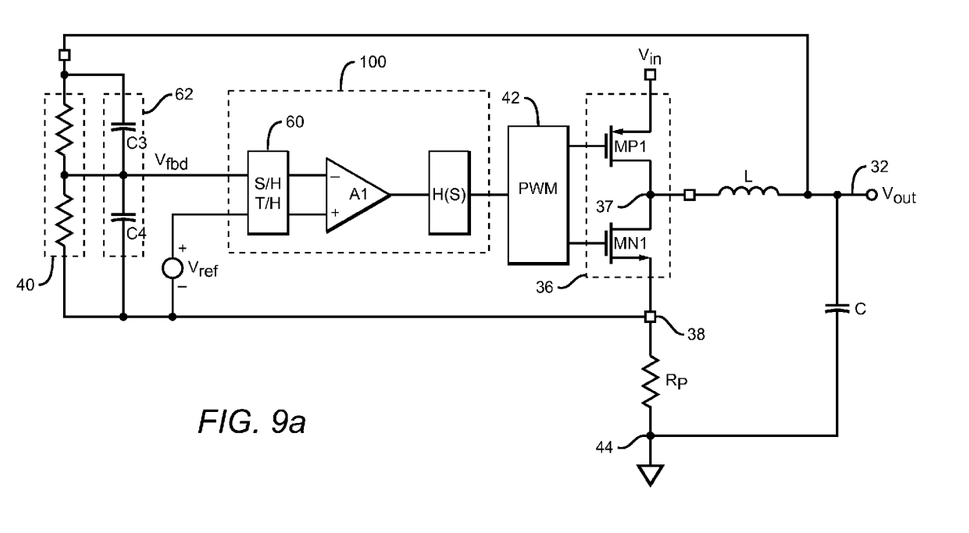
FIG. 9a is a block/schematic diagram illustrating one possible order of circuit blocks for a switching power supply controller per the present invention.
Figure 9C:
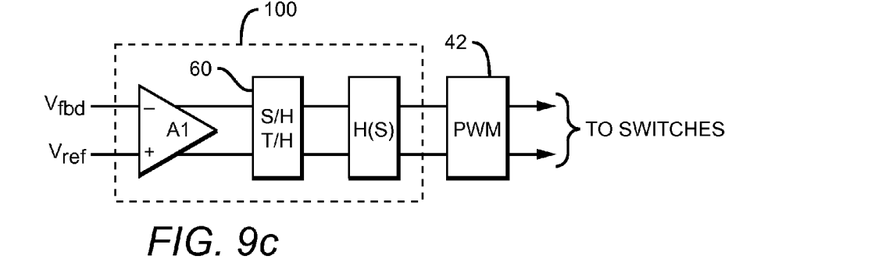
FIG. 9c is a block/schematic diagram illustrating another possible order of circuit blocks for a switching power supply controller per the present invention.

Other possible embodiments are shown in FIGS. 9a-9c, which illustrate that the order of the circuit blocks in a system of this sort can be modified and still provide the same functionality. In each of these figures, box 100 contains the S/H-T/H circuitry 60, error amplifier A1 and a compensator circuit H(s) (FIGS. 9b and 9c show only box 100, with the rest of the controller components omitted for clarity). Compensator circuits, which are well-known to those familiar with switching power supply design, are normally used to correct the AC phase and gain characteristics of the overall feedback loop. It is preferred that the present controller be arranged to disturb the loop dynamics as little as possible, which enables the controller designer to employ a known design for compensator H(s). The order in which these elements are connected is different in each figure; however, all of these arrangements yield similar results. Also note that systems in accordance with the present invention can be single-ended or differential or a combination of both, all the way up to PWM circuitry 42 and its comparators.

Figure 10:
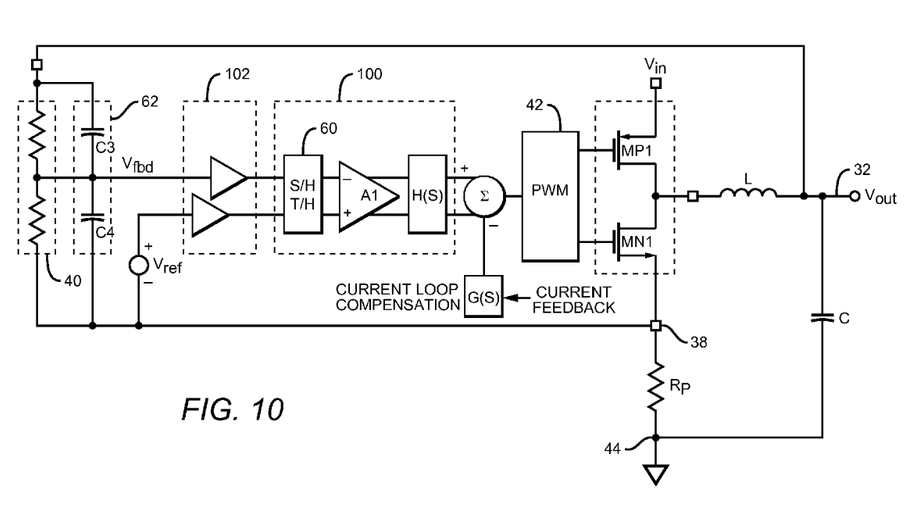
FIG. 10 is a block/schematic diagram illustrating an embodiment of a switching power supply controller per the present invention which employs current mode control.

The invention is useful with both voltage mode controllers (as described above) and current mode controllers. In current mode controllers, the same parasitic resistance-related problem can exist, affecting regulation and dynamic performance. An exemplary embodiment of a current mode controller which includes the present system is shown in FIG. 10. As above, the S/H-T/H circuitry, error amplifier A1 and compensator circuit H(s) elements within box 100 can be ordered differently than that shown and yet yield similar results. Buffer amplifiers 102 can be optionally included as noted above. As with the voltage mode embodiments discussed above, both single-ended and differential current mode embodiments are contemplated.

Note that the present controller is not limited to systems which include an internal feedback divider network. Even if only the reference voltage ($V_{ref}$) is generated on the chip, the switch current-induced error will still be introduced. If both the feedback divider network and $V_{ref}$ are referenced to external ground, the invention is not needed. However, the present controller is useful for all other combinations—i.e., feedback divider and $V_{ref}$ referenced to internal chip ground; feedback divider referenced to internal chip ground and $V_{ref}$ referenced to external ground; and feedback divider referenced to external ground and $V_{ref}$ referenced to internal chip ground. For each of these cases, S/H and/or T/H circuitry as described above would be employed on the signals referenced to internal chip ground.

The effectiveness of the present controller is highest when the S/H and T/H circuitry is located as close to the feedback divider and voltage reference as possible. The later in the signal chain the S/H-T/H circuitry is placed, the more likely it is that there will be lags in the system which will require altering the timing shown to get the proper result.

It must be noted that the circuits illustrated herein are merely exemplary. As stated above, the order of the circuit blocks in systems of this sort can be modified and still achieve the same result. It should also be noted that there may be circuit blocks in the controller's signal path in addition to those discussed herein, either before or after the T/H and/or S/H circuitry.

It should also be noted that, though a buck converter is described above, the present system is also applicable to other converter topologies, and in fact to any switching power supply system having a periodic signal across a parasitic element—which may include both resistive and reactive components—that is shared with a measurement path that generates a large enough error to cause the normal circuit operation to be disrupted.

It will be appreciated by those practiced in the art of switching power supply design and also to those who design sampled data systems that numerous fractional delay cells are commonly used in a design to finely adjust the timing of switching and sampling functions to avoid self generated noise and similar objectionable signals of a transient, synchronous nature. In most cases, these delays are less than 5-10% of the nominal switching period and are generally adjusted to improve the system performance. In the preferred embodiment, small delays, of about 1-4% of the switching period, are used to start the S/H and T/H circuits after the power devices are switched so that the initial switching transients are rejected. It will further be appreciated that these delays are not overly precise and that the total amount of added delay is generally less than the desired minimum duty cycle of the converter.

While particular embodiments of the invention have been shown and described, numerous variations and alternate embodiments will occur to those skilled in the art. Accordingly, it is intended that the invention be limited only in terms of the appended claims.

I claim:

1. A switching power supply controller which is adapted to be connected to external components to produce a regulated output voltage at an output node, comprising:

at least one switching element, said controller arranged to control a switching cycle during which said switching elements are switched on and off to regulate the output voltage at said output node;

a feedback signal which represents the output voltage produced at said output node;

a circuit node which conducts a current that is higher during a second portion of said switching cycle than it is during a first portion of said switching cycle, said controller arranged such that said feedback signal varies with the current conducted by said circuit node; and a sampling circuit arranged to sample a signal which varies with said feedback signal only during said first portion of said switching cycle, said controller arranged to regulate said output voltage in response to said sampled signal.

2. The controller of claim 1, wherein said controller is contained within an integrated circuit (IC) and said circuit node is an internal IC ground.

3. The controller of claim 1, wherein said at least one switching element comprises two switching elements, one of which is switched on during said first portion of said switching cycle and the other of which is switched on during said second portion of said switching cycle.

4. The controller of claim 1, wherein said at least one switching element comprises a first switching element connected between a supply voltage node and a switching node and a second switching element connected between said switching node and a circuit ground, said circuit node being said circuit ground, said controller arranged such that said first switching element is switched on during said first portion of said switching cycle and said second switching element is switched on during said second portion of said switching cycle.

5. The controller of claim 1, wherein said at least one switching element comprises a first switching element connected between a supply voltage node and a switching node and a second switching element connected between said switching node and a circuit ground, said circuit node being said supply voltage node, said controller arranged such that said second switching element is switched on during said first portion of said switching cycle and said first switching element is switched on during said second portion of said switching cycle.

6. The controller of claim 1, wherein said sampling circuit is a sample and hold (S/H) circuit.

7. The controller of claim 1, wherein said sampling circuit is a track and hold (T/H) circuit.

8. The controller of claim 7, wherein said T/H circuit tracks said signal which varies with said feedback signal throughout said first portion of said switching cycle, and holds the peak value of said tracked signal throughout said second portion of said switching cycle.

9. The controller of claim 1, wherein said sampling circuit comprises at least one sample and hold (S/H) circuit and one track and hold (T/H) circuit.

10. The controller of claim 1, wherein said sampling circuit is further arranged to produce an output which approximates the portion of said feedback signal's waveform which is not sampled.

11. A switching power supply controller which is adapted to be connected to external components to produce a regulated output voltage at an output node, comprising:
 at least one switching element, said controller arranged to control a switching cycle during which said switching elements are switched on and off to regulate the output voltage at said output node;
 a feedback signal which represents the output voltage produced at said output node;
 a circuit node which conducts a current that is higher during a second portion of said switching cycle than it is during a first portion of said switching cycle, said controller arranged such that said feedback signal varies with the current conducted by said circuit node; and
 a sampling circuit arranged to sample a signal which varies with said feedback signal only during said first portion of said switching cycle, said controller arranged to regulate said output voltage in response to said sampled signal;
 wherein said sampling circuit is further arranged to produce an output which approximates the portion of said feedback signal's waveform which is not sampled; and
 wherein said feedback signal's waveform is an upslope during the first portion of said switching cycle and a downslope during the second portion of said switching cycle, said sampling circuit comprising:
 an input node connected to receive said feedback signal or a signal which varies with said feedback signal;
 a sampling capacitor connected between a first node and a circuit common node;
 a sampling switch connected between said input node and said first node;
 a tracking capacitor connected between a second node and said circuit common node, said sampling circuit's output produced at said second node;
 a tracking switch connected between said input node and said second node;
 a discharge switch connected between said first and second nodes; and
 a resistance connected in series with said discharge switch between said first and second nodes;
 said controller arranged such that, during the first portion of said switching cycle:
 said sampling switch is closed for a time sufficient to cause said sampling capacitor to be charged to a voltage approximately equal to the voltage of the signal applied to said input node at the beginning of said upslope;
 said tracking switch is closed so as to cause said tracking capacitor to be charged to a voltage approximately equal to the voltage of the signal applied to said input node at the peak of said upslope; and
 said discharge switch is open;
 and such that, during the second portion of said switching cycle:
 said sampling switch is open;
 said tracking switch is open; and
 said discharge switch is closed, such that the voltage stored on said tracking capacitor is discharged through said resistance such that said sampling circuit's output decays towards the voltage stored on said sampling capacitor.

12. A switching power supply controller which is adapted to be connected to external components to produce a regulated output voltage at an output node, comprising:
 at least one switching element, said controller arranged to control a switching cycle during which said switching elements are switched on and off to regulate the output voltage at said output node;
 a feedback signal which represents the output voltage produced at said output node;
 a circuit node which conducts a current that is higher during a second portion of said switching cycle than it is during a first portion of said switching cycle, said controller arranged such that said feedback signal varies with the current conducted by said circuit node;
 a sampling circuit arranged to sample a signal which varies with said feedback signal only during said first portion of said switching cycle, said controller arranged to regulate said output voltage in response to said sampled signal;
 a reference voltage; and an error amplifier arranged to produce an output which varies with the difference between first and second signals applied at respective inputs, a signal which varies with the output of said sampling circuit provided to said error amplifier's first input and a signal which varies with said reference voltage provided to said error amplifier's second input.

13. The controller of claim 12, further comprising a buffer amplifier connected between the output of said sampling circuit and said error amplifier's first input.

14. The controller of claim 12, further comprising a second sampling circuit arranged to sample said reference voltage only during said first portion of said switching cycle, the output of said second sampling circuit provided to said error amplifier's second input.

15. The controller of claim 14, further comprising first and second buffer amplifiers connected between the outputs of respective sampling circuits and said error amplifier's first and second inputs, respectively.

16. The controller of claim 1, further comprising a resistive divider which is coupled to said output node and produces said feedback signal at an output.

17. The controller of claim 16, further comprising a capacitive network coupled to said resistive divider and arranged to provide high frequency compensation for said divider.

18. The controller of claim 1, wherein said controller and feedback signal form a feedback loop, further comprising a compensator circuit connected in the signal path between said feedback signal and said switching elements, said compensator circuit arranged to correct AC phase and gain characteristics of said feedback loop.

19. The controller of claim 1, further comprising:
a reference voltage; and
an error amplifier arranged to produce an output which varies with the difference between first and second signals applied at respective inputs, said feedback signal provided to said error amplifier's first input and a signal which varies with said reference voltage provided to said error amplifier's second input, said sampling circuit arranged to sample the output of said error amplifier.

20. The controller of claim 1, wherein said controller is configured to provide voltage mode control.

21. The controller of claim 1, wherein said controller is configured to provide current mode control.

22. A switching power supply controller which is adapted to be connected to external components to produce a regulated output voltage at an output node, comprising:
a first switching element connected between a supply voltage node and a switching node;
a second switching element connected between said switching node and a circuit ground node, said controller arranged such that said first switching element is switched on during a first portion of a switching cycle and said second switching element is switched on during a second portion of said switching cycle so as to regulate the output voltage at said output node, such that said circuit ground node conducts a current that is higher during said second portion of said switching cycle than it is during said first portion of said switching cycle;
a feedback signal which represents the output voltage produced at said output node, said controller arranged such that said feedback signal varies with the current conducted by said circuit ground node;
a sampling circuit arranged to sample a signal which varies with said feedback signal only during said first portion of said switching cycle;
a reference voltage; and
an error amplifier arranged to produce an output which varies with the difference between first and second signals applied at respective inputs, a signal which varies with the output of said sampling circuit provided to said error amplifier's first input and a signal which varies with said reference voltage provided to said error amplifier's second input, said controller arranged to regulate said output voltage in response to said sampled signal.

23. The controller of claim 22, wherein said sampling circuit is further arranged to produce an output which approximates the portion of said feedback signal waveform which is not sampled.

24. The controller of claim 22, wherein said controller is contained within an integrated circuit (IC) and said circuit node is an internal IC ground.

25. The controller of claim 22, further comprising a second sampling circuit arranged to sample said reference voltage only during said first portion of said switching cycle, the output of said second sampling circuit provided to said error amplifier's second input.

* * * * *